Patented Oct. 11, 1949

2,484,633

UNITED STATES PATENT OFFICE 2,484,633

REARRANGEMENT AND ALCOHOLYSIS OF NITROSYL CHLORIDE-ISOBUTYLENE ADDUCT

Andrew J. Martin, East Orange, N. J., assignor to Allied Chemical & Dye Corporation, New York, N. Y., a corporation of New York No Drawing. Application May 26, 1948, Serial No. 29,408

3 Claims. (Cl. 23—190)

1

This invention relates to a process for rearranging isobutylene-nitrosyl chloride adduct to obtain valuable products therefrom.

It is a principal object of my invention to obtain, from isobutylene-nitrosyl chloride adduct, hydrazine in the form of its dihydrochloride, and organic reaction products.

Other objects and advantages of my invention will appear more fully hereinafter.

I have found that when isobutylene-nitrosyl chloride adduct is maintained in contact with hydrogen chloride in an organic reaction medium the adduct is rearranged, and in contact with a lower monohydric alcohol forms hydrazine dihydrochloride and organic reaction products, chiefly alpha-chlorisobutyraldehyde dialkyl acetal and alkyl alpha-chlorisobutyrate.

In pure form the isobutylene-nitrosyl chloride adduct referred to herein is a crystalline solid having an elementary composition corresponding to the empirical formula $C_4H_8NOCl$. On the basis of its molecular weight in benzene solution the product is bimolecular. This fact combined with its showing an ultraviolet absorption spectrum characteristic of the nitroso group indicates that the solid adduct should be regarded as a bis-nitroso compound. The melting point of the solid adduct recrystallized from benzene is about 104° C. (with decomposition). Methods for the preparation of this solid have been described in the art, for example U. S. P. 2,394,430 of February 5, 1946 to Crowder et al. The above discussed compound is referred to herein as iso-butylene-nitrosyl chloride adduct.

The rearrangement step may conveniently be effected by passing hydrogen chloride to saturation into the organic reaction medium, cooled below room temperature, containing solid adduct. The alcohol to be used in the succeeding step, or ether, chloroform, benzene, etc. may serve as the reaction medium. The temperatures at which this rearrangement step is effected suitably may be from about 0° to 60° C. Under the influence of the hydrogen chloride the solid adduct forms an oil and dissolves in the raction medium.

When all of the solid has been transfored to oil or has dissolved, the alcohol which is to react with the rearrangement product may be added and the reaction mixture may be allowed to warm up to temperatures between room temperature and reflux temperatures, and may be maintained for several hours at the desired temperatures. Suitably, at least about 1.0 mol of alcohol per mol of adduct (regarded as a monomer) is taken. When the mixture is cooled, crystals of

2 hydrazine dihydrochloride may be separated from the liquid by filtration and the organic products may be purified by washing with water, extracting the washings, e. g. with ether, and fractionating the organic layers.

If the alcohol to be employed in the final stage of my process was used as reaction medium then of course it is only necessary to maintain contact between the product of rearrangement and the alcohol, suitably at reflux temperatures, to obtain hydrazine dihydrochloride and organic products as above.

Methanol is typical of the alcohols which may be used in my process. Other lower monohydric alcohols, i. e. alcohols containing not more than 5 carbon atoms, which may be used include ethanol, butanol and propanol.

The following examples illustrate my invention but are intended to be illustrative only and not to limit the scope of the invention:

*Example 1.*—100 ml. of methanol were saturated with hydrogen chloride with ice cooling. 61 grams of nitrosyl chloride-isobutylene adduct were added and more hydrogen chloride was passed in. The reaction mixture was allowed to stand overnight and was then heated under reflux for 5 hours. The reaction mixture was cooled and diluated with ether. The precipitated salt was removed by filtration. It weighed 20.0 grams and melted at 195°–197° C. with decomposition. It was identified as hydrazine dihydrochloride. The yield represents 76% of theory.

The filtrate was distilled under reduced pressure leaving a viscous residue. The distillate was poured into water and the water-oil mixture was extracted with ether, dried and distilled. A methyl alpha-chlorisobutyrate fraction and an alpha-chlorisobutyraldehyde dimethyl acetal fraction were obtained.

The refluxing step is not essential in my process. Similar results to those of this example were obtained when the same procedure was followed except that the step of heating the reaction mixture above room temperature was omitted.

*Example 2.*—366 grams of nitrosyl chloride-isobutylene adduct in 650 ml. of dry ether were saturated with dry hydrogen chloride with ice-salt cooling. The adduct went into solution in about 1 hour. After an additional ½ hour 500 ml. of methanol were added and the reaction mixture was allowed to stand overnight. A thick layer of crystals formed on the walls of the flask. The reaction mixture was then refluxed for 6 hours. The crystals of hydrazine dihydrochloride were removed by filtration and washed with methanol and then with ether. The dried crystals weighed 123.5 grams (about 78% of theory) and after recrystallization from water melted at 199°–200° C.

The filtrate and washings were poured into water. The organic layer was separated and the aqueous layer was extracted with several portions of ether. The combined organic material was washed with sodium carbonate solution and dried. After removal of the ether the oil weighed 334 grams. This oil contained principally methyl alpha-chlorisobutyrate and alpha-chlorisobutyraldehyde dimethyl acetal.

I claim:

1. The process for rearrangement of isobutylene-nitrosyl chloride adduct to form hydrazine dihydrochloride and organic reaction products which comprises maintaining the adduct in contact with hydrogen chloride in an organic reaction medium until adduct has been transformed to the liquid state and maintaining the resulting liquid in contact with a monohydric alcohol containing not more than 5 carbon atoms until hydrazine dihydrochloride and organic reaction products have been formed.

2. A process in accordance with claim 1 in which the rearrangement in the presence of hydrogen chloride is carried out at temperatures within the range of 0° to 60° C. and the final stage of the reaction with the monohydric alcohol is carried out at temperatures within the range from room temperatures to reflux temperatures.

3. A process in accordance with claim 2 in which the monohydric alcohol is methanol.

ANDREW J. MARTIN.

REFERENCES CITED

The following references are of record in the file of this patent:

UNITED STATES PATENTS

| Number | Name | Date |
|---|---|---|
| 2,265,993 | Beckham | Dec. 16, 1941 |
| 2,370,518 | Beekhuis | Feb. 27, 1945 |
| 2,371,418 | Beckham | Mar. 13, 1945 |
| 2,394,430 | Crowder | Feb. 5, 1946 |
| 2,435,570 | Beckham | Feb. 10, 1948 |